United States Patent

[11] 3,609,180

| [72] | Inventors | Hiroshi Shigematsu<br>2-6, 1-chome, Muronoki-machi<br>Yamaguchi-ken, Iwakuni-shi;<br>Yasushi Shibahara, 12-35, 2-chome,<br>Shinmachi, Otake-shi, Hiroshima-ken, both<br>of Japan |
|------|-----------|---|
| [21] | Appl. No. | 573,825 |
| [22] | Filed | Aug. 22, 1966 |
| [45] | Patented | Sept. 28, 1971 |
| [32] | Priority | Aug. 27, 1965, Oct. 23, 1965, Nov. 17, 1965, Dec. 21, 1965, Mar. 7, 1966 |
| [33] | | Japan |
| [31] | | 40/51945, 40/64964, 40/70241, 40/78365 and 41/13546 |

[54] PROCESS FOR PREPARING CARBOXYLIC ACID ESTERS OF UNSATURATED ALCOHOLS
17 Claims, No Drawings

[52] U.S. Cl. .................................................. 260/497 A,
    252/429 C, 252/430, 260/597 B, 260/604 AC
[51] Int. Cl. ........................................................ C07c 67/04
[50] Field of Search ............................................ 260/497 A

[56] References Cited
FOREIGN PATENTS
615,596  9/1962  Belgium ...................... 260/497

*Primary Examiner*—Lewis Gotts
*Assistant Examiner*—Vivian Garner
*Attorney*—Sherman & Shalloway ABSTRACT: A process for preparing the corresponding carboxylic acid esters of unsaturated alcohols by contacting olefins with aliphatic carboxylic acids in the presence of a gas selected from the group consisting of oxygen and oxygen-containing gases, using as catalyst a palladium salt and a copper salt, the improvement which comprises effecting the reaction in the presence of an organo-quaternary ammonium compound, said ammonium compound being one which does not have hydrogen directly linked to nitrogen and which can form under reaction conditions a carboxylic acid-soluble complex with said palladium salt.

PROCESS FOR PREPARING CARBOXYLIC ACID ESTERS OF UNSATURATED ALCOHOLS

This invention relates to a process for preparing carboxylic acid esters of unsaturated alcohols by reacting olefins, aliphatic carboxylic acids and oxygen in the presence of a catalyst. More particularly, this invention relates to a process which comprises reacting in the presence of a palladium salt, a copper salt and an organo-quaternary ammonium compound not having hydrogen atoms directly attached to nitrogen atoms and which can form under reaction conditions a carboxylic-acid-soluble complex with said palladium salt, an olefin, an aliphatic carboxylic acid and oxygen to form the corresponding carboxylic acid esters of unsaturated alcohols. The invention comprehends particularly the process for preparing propenyl acetate from propylene.

The term "olefins," as used herein, comprehends ethylene and propylene. Propenyl is a generic term of the hydrocarbon group represented by the formula $C_3H_5-$ and denotes the n-propenyl, isopropenyl and 2-propenyl (allyl) groups. As the aliphatic carboxylic acids, included are acetic, propionic, butyric, valeric and caproic acids.

The organo-quaternary ammonium compounds, as used in this invention, are those compounds which are defined in Kirk-Othmer's Encyclopedia of Chemical Technology, vol. 11 (1953) page 375, under "Quaternary Ammonium Compounds" and denote the organo-quaternary ammonium halides of the formula $R_1 \cdot R_2 \cdot R_3 \cdot R_4 \cdot NX$, and hydroxides of the formula $R_1 \cdot R_2 \cdot R_3 \cdot R_4 \cdot NOH$ wherein $R_1-R_4$, which may be the same or different, are alkyl groups having 1-18 18 carbon atoms, alkyl groups containing at least one of either an either linkage, hydroxyl or carboxyl group, phenyl group in case of halides, or benzyl group, where $R_1R_2R_3N$ may be a cyclic nitrogen compound such as a pyridine nucleus, and X is either halogen; the compounds which are defined in the same reference, vol. 2 (1953) page 509, under "Betaine" and denote betaine (inclusive of their derivatives) of the formula $R_5 \cdot R_6 \cdot R_7 \cdot N(CH_2)_n{}^+COO^1$ and $R_5 \cdot R_6 \cdot R_7 N^+ CH(R_8)COO^-$, wherein $R_5-R_7$, which may be the same or different, are alkyl groups of 1–180carbon atoms. an alkyl group having 1–180 carbon atoms, and $n$ is an integer 1–3; the compounds which are defined in the same reference, vol. 1 (1952) page 703 under "Amines" and denote the amine-N-oxides (inclusive of their hydrohalides) of the formula $R_9 \cdot R_{10} \cdot R_{11} \cdot NO$, wherein $R_9-R_{11}$, which may be the same or different, are alkyl groups having 1–3 carbon atoms, phenyl group and benzyl group, where $R_9R_{10}N$ may be a cyclic nitrogen compound such as the pyridine nucleus. Thus, the term "organo-quaternary ammonium compounds," as used in this invention, is a generic term of the quaternary ammonium compounds, inclusive of the amine-N-oxides, which can form under reaction conditions a complex with palladium salts which is soluble in aliphatic carboxylic acids, the catalysts used in this invention, and which moreover does not have hydrogen directly attached to nitrogen (N-H bond).

Further, the terminology "in the presence of an organo-quaternary ammonium compound" is a terminology which not only refers to the instance where the foregoing compound is added to the reaction system and the complex is formed therein, but also to the instance where a previously prepared complex is used.

The process for preparing carboxylic acid esters of unsaturated alcohols by reacting in the presence of palladium salts and copper salts, olefins, aliphatic carboxylic acids and oxygen has already been proposed (e.g. British Pat. Specification No. 964,001). The rate of this reaction is low, however, and it is not entirely satisfactory for commercial operations. Studies aiming to improve the catalyst system to be used in this reaction have therefore been made by numerous researchers, in consequence of which it was discovered and proposed that the rate of reacting olefins, aliphatic carboxylic acids and oxygen could be enhanced by the presence of an alkali metal carboxylate and/or halide besides the palladium and copper salts. It was found that good results were obtained especially when as the alkali metal salt a lithium salt, such as lithium acetate and lithium chloride, was used as compared with the instance of the use of a sodium or potassium salt. (e.g. British Pat. Specification No. 964,001). Further, as a cheaper reaction promoter, a proposal has been made to add an amine which does not react with palladium compounds under reaction conditions. (Belgian Pat. No. 608,611). Aside from these, there is also proposed the use of amines, ammonia or the salts of organic amines such as the acetates of trimethyl ammonium and pyridinium salts such as the acetates of N-ethylpiperidine. (Belgian Pat. No. 615,596). Many of these, however, do not have any satisfactory reaction-promoting effect. Further, a yellow precipitate is formed which contains palladium salts and pyridinium salts, which is insoluble in carboxylic acids and hence are exceedingly disadvantageous for practicing on a commercial scale.

As a result of having engaged in researches with the intent of providing an improved process by which to carry out the known process of preparing carboxylic acid esters of unsaturated alcohols by contacting olefins with aliphatic carboxylic acids in the presence of oxygen or an oxygen-containing gas, using as catalysts the palladium and copper salts, we found that this object could be attained by a process which uses a catalyst system which not only possesses greater catalytic activity than the conventional catalysts but also forms a completely homogeneous system as well as does not form an insoluble precipitate in the system during the operation of the process. Namely, it was found that an exceedingly high catalytic activity was demonstrated in the foregoing reaction system by a new catalyst system which comprises, instead of the two components of a palladium carboxylate, such as palladium acetate or a palladium halide such as palladium chloride, and a copper salt, as proposed in the prior art, a copper salt and a complex consisting of a palladium salt differing from the foregoing palladium salts and an organo-quaternary ammonium compound which does not have hydrogen directly attached to nitrogen.

As will be more fully described hereinafter, it was found to our surprise that the high catalytic activity possessed by this new catalyst system was presumed to be shown by the aforesaid complex per se upon being present with the copper salt and not by an increase in the concentration of the palladium salt in the reaction solution. For instance, if, in accordance with the prior proposals, a palladium salt and a copper salt are used as catalysts, to which is further added an alkali metal salt, the concentration of palladium salt in the reaction system can be increased, but there is noted no significant increase in catalytic activity. On the other hand, when, in accordance with the present invention process, an organo-quaternary ammonium compound not having hydrogen directly attached to nitrogen is caused to be present together in this known system to form a complex of the palladium salt and said ammonium compound, which is soluble in the reaction solution system, the catalytic activity shows a pronounced increase.

It was found that the results were the same in the other processes even though the concentration in the reaction system of palladium catalyst was increased. For example, even though the solubility in acetic acid of palladium chloride was increased by the addition of diethyl sulfide and the concentration of said known palladium catalyst in the reaction solution system is increased, the formation of the intended product was not improved by such an operation. We found that the results were also the same, for example, even when pyridine. which can form a complex with a palladium salt, was caused to be present together and also, for example, even when ammonium chloride or ammonium acetate was added.

Hence, considering that the activity of the catalyst in the reaction system of this invention could not be improved by the concept of promoting the reaction by increasing the concentration of the catalyst palladium salt in the reaction solution system, it has been indeed unexpected to find that by changing the catalyst compound itself and using a specific complex which had never been proposed hitherto a pronounced increase in catalytic possessed by said complex per se.

It is therefore an object of this invention to provide a process for preparing from olefins their corresponding carboxylic acid esters of unsaturated alcohols wherein, in the known process of preparing these esters by reacting olefins with aliphatic carboxylic acids and either oxygen or an oxygen-containing gas, in the presence of a catalyst, the reaction is carried out using a catalyst consisting of a combination of a copper salt and a complex which had never been proposed hitherto, whereby the intended product can be obtained at a conversion ration which shows a marked improvement over that of the conventional processes, and in addition the shortcomings of the conventional processes, such as the disadvantage from the operational standpoint that attend the formation of insoluble precipitates as well as the disadvantage resulting from the precipitation of the expensive palladium salt, can be surmounted at the same time.

Another object of the invention is to provide such a catalyst.

Other objects and advantages of this invention will be apparent from the description which follows.

The objects of the invention are attained by carrying out the aforesaid known reaction using, as the other catalyst component to be combined with the copper salt to be present therein, an organo-quaternary ammonium compound which can form a complex soluble in aliphatic carboxylic acids by reacting with a palladium salt under reaction conditions and which does not have hydrogen directly attached to nitrogen.

As previously noted, the reaction is carried out in such a reaction system in the presence of a catalyst consisting of the combination of the foregoing soluble complex of the heretofore-known palladium salt and an organo-quaternary ammonium compound, the new catalyst component, and the heretofore-known copper salt.

The reaction rate of the aforesaid esterification reaction is favorably enhanced by means of such a catalyst system. At the same time, since there is no possibility of the precipitation of the expensive palladium salt and the copper salt, and even if there should be some precipitation by chance, the amount being negligible, the reaction can be carried out with great economic advantage. Further, since there is no formation of an insoluble precipitate, there is no clog of the pipes. Hence, the operation on a commercial scale of this reaction is facilitate. Namely, the present invention is directed to a process for preparing carboxylic acid esters of unsaturated alcohols which is characterized in that an olefin, an aliphatic carboxylic acid and oxygen are reacted in the presence of a palladium salt, a copper salt and a quaternary ammonium compound which forms a complex with the palladium salt, said ammonium compound being selected from the group consisting of organo-quaternary ammonium halides, organo-quaternary ammonium hydroxides, betaine (inclusive of their derivatives) and amine-N-oxides (inclusive of their hydrohalides). This process is an advantage in the preparation of particularly vinyl acetate and propenyl acetates. Further, the halides of alkali metals and/or the carboxylates of alkali metals can be used as a reaction promoter along with the palladium and copper salts and the aforesaid organo-quaternary ammonium compounds.

In practicing this invention, the reaction can be carried out by introducing the olefins and oxygen, with or without pressure, into a catalytic solution consisting of an aliphatic carboxylic acid in which has been dissolved a palladium salt, a copper salt and the aforesaid organo-quaternary ammonium compound. The resulting carboxylic esters of unsaturated alcohols, and acetaldehyde, acetone and acrolein which are formed as byproducts, are removable from the reaction product by means of, say, fractional distillation. On the other hand, the bottom residue containing aliphatic carboxylic acids is recycled to the reaction system and reused.

The organo-quaternary ammonium compounds which are effectively used in this invention for forming complexes with palladium salts are exemplified below.

A. As the organo-quaternary ammonium halide of the formula $R_1R_2R_3R_4NX$, where $R_1$, $R_2$, $R_3$, $R_4$ and X have the meanings previously defined, included are the following three groups:

1. Aliphatic quaternary ammonium halides such as tetraethyl-ammonium halide, octadecyltrimethylammonium halide and cetyldimethylethylammonium halide.
2. N-benzyl quaternary ammonium halides such as trimethylbenzylammonium halide, triethylbenzylammonium halide and cetyl dimethylbenzylammonium halide.
3. Quaternary ammonium halides having a nitrogen-containing nucleus such as butylpyridinium halide, laurylpyridinium halide, 2-dodecylisoquinolinium halide, cetylpyridinium halide, methoxymethylpyridinium halide and methoxycetyl-pyridinium halide.

B. As the organo-quaternary ammonium hydroxides of the formula $R_1R_2R_3R_4NOH$, where $R_1$, $R_2$, $R_3$ and $R_4$ have the meanings previously defined, included are following two groups:

1. Aliphatic quaternary ammonium hydroxides such as tetramethylammonium hydroxide, tetraethylammonium hydroxide, tetrabutylammonium hydroxide, 2-hydroxyethyltrimethyl-ammonium hydroxide $[(CH_3)_3NCH_2CH_2H]^+OH^1$, dimethyl (2-hydroxyethyl) dodecylammonium hydroxide $[C_{12}H_{25}N(CH_3)_2CH_2CH_2OH]^+OH^1$, methyl beta-(N-methyl-N-dodecyl) aminopropionate betaine hydrate $[C_{12}H_{25}N(CH_3)_2CH_2CH_2COOH]OH^1$.
2. N-phenyl and benzyl quaternary ammonium hydroxides such as dimethyl (2-hydroxyethyl) phenylammonium hydroxide $[C_6H_5N(CH_3)_2CH_2CH_2OH]^+OH^1$ and trimethylbenzylammonium hydroxide $[C_6H_5CH_2N(CH_3)_3]^+OH^1C$.

As the betaine and the derivatives thereof of the formula $R_5R_6R_7N(CH_2)_n{}^+COO^-$ and $R_5R_6R_7N^+CH(R_8)COO^1$, where $R_5$, $R_6$, $R_7$, $R_8$ and $n$ have the meanings previously defined, included are the following two groups:

1. Betaine or their derivatives, which are generally known as amphoteric surface active agents, such as betaine $(CH_3)_3NCH_2COO^1$, myristyl betaine $(CH_3)_3N^+CH(C_{14}H_{29}coo^1$ and N-hexadecyloxymethyl-N,N-dimethyl betaine $C_{16}H_{33}OCH_2N^+(CH_3)_2CH_2COO^1$.
2. The reaction products of tertiary amines with beta-propiolactone, such as methyl-beta-(N-methyl-N-dodecyl) aminopropionate betaine $C_{12}H_{25}N^+(CH_3)_2CH_3CH_2COO^1$ and methyl-beta-(N-methyl-N-benzyl) aminopropionate betaine $C_6H_5CH_2N^+(CH_3)_2CH_2CH_2COO^1$, and the hydrohalides thereof.

D. As the amine-N-oxides of the formula $R_9R_{10}R_{11}N\rightarrow O$, where $R_9$, $R_{10}$ and $R_{11}$ have the meanings previously defined, and the hydrohalides thereof, included are the following three groups:

1. Aliphatic amine-N-oxides, such as trimethylamine-N-oxide, and the hydrohalides thereof.
2. Aromatic amine-N-oxides, such as dimethylaniline-N-oxide and dimethylbenzylaniline-N-oxide, and the hydrohalides thereof.
3. Cyclic nitrogen compounds, such as pyridine-N-oxide, and the hydrohalides thereof.

The amount used of these organo-quaternary ammonium compounds is normally suitably 0.001 to 1.0 mol. per 1,000 cc. of the aliphatic carboxylic acid. While a chloride is usually used as the organo-quaternary ammonium halide, the bromides and iodides can also be used. The halogen ion of the hydrohalides of amine-N-oxides is usually chlorine ion, but the bromine and iodine ions may also be used. Further, the hydrohalides of amine-N-oxides, instead of being added thereto as an aqueous solution containing an amine-N-oxide and a hydrohalide and caused to form a salt in the reaction zone.

The functional mechanism of the organo-quaternary ammonium compound, which is used in forming the complex of a palladium salt, one of the components of the invention catalyst, can be explained in the following manner; for example, when preparing vinyl acetate using ethylene and acetic acid. Namely, the organo-quaternary ammonium compound forms a complex in acetic acid with the palladium salt, say, palladium chloride. This complex is very soluble in acetic acid. Hence, since a larger amount of the complex can be dissolved in a smaller amount of a carboxylic acid, the complex of the palladium salt and the organo-quaternary ammonium compound can be maintained in the reaction solution at a high concentration. Thus, the palladium salt becomes present in the reaction system in a high concentration in the form of said complex. However, as can be seen from the fact that although the solubility of the palladium salt in the case of using a catalyst solution containing an alkali metal salt besides the palladium and copper salts is of the same degree as the instance of using the complex of a palladium salt and an organo-quaternary ammonium compound, in terms of the palladium salt, the effect of promoting the reaction is far inferior in the former case. Thus an increase in the solubility of the palladium salt in this reaction system does not necessarily result in an increase in the reaction rate.

It is believed that the aforesaid promoting effect on the esterification reaction by the catalyst used in this invention is not due to the increase in the solubility of the catalyst but due to the attributes possessed by the catalyst compound itself. Namely, even though a compound, which in acetic acid forms a complex with a palladium salt, is added to and the concentration of the palladium salt in the catalyst solution is increased, the present reaction is not necessarily promoted to advantage. For instance, it is disclosed in J. W. Mellor, A Comprehensive Treatise on Inorganic and Theoretical Chemistry, vol. 15, page 666 that diethyl sulfide and palladium chloride form a complex $Pd[(C_2H_5)_2S]Cl_2$. And, it can be considered as a fact that in the form of a complex with diethyl sulfide the solubility and hence the concentration in acetic acid of the palladium chloride increases and reaches higher range when considered from only that contained in the complex. However, even when, say, ethylene and oxygen are introduced into this catalyst solution, the results are no different from the instance where the complex of diethyl sulfide and the palladium salt has not been used but the palladium salt has been used as such, the yield of vinyl acetate being very small. Thus, it is greatly surprising to find that, on one hand, even though a compound which forms a complex with palladium chloride in acetic acid is added to the catalyst solution with no appreciable effect in promoting the present reaction, on the other hand, that the reaction proceeds highly favorably when the aforesaid complex of a palladium salt and an organo-quaternary ammonium compound is used. Further, in the case where a small quantity of pyridine or the hydrochlorides thereof is used with the palladium and copper salts, they form complexes with the palladium salt, but different from the instance where an organo-quaternary ammonium salt having a nitrogen-containing nucleus, for example, cetylpyridinium chloride is used, the previously indicated $R_1R_2R_3N$ forms a nitrogen-containing nucleus, the reaction-promoting effect is not manifested. Likewise, no reaction-promoting effect is observed by the addition of either ammonium chloride or ammonium acetate.

While the complex is normally formed in a ratio of the palladium salt to the organo-quaternary ammonium compound of 1:20 a marked reaction-promoting effect is also observed where the complex, one of the components as used in the catalyst of this invention, is formed in the reaction system by adding the organo-ammonium compound and the palladium salt in a ratio either more or less than that mentioned above, if the amount is enough to form the said complexes.

Palladium chloride is usually used as the palladium salt, but the palladium halides such as palladium bromide and palladium iodide or the palladium carboxylates such as palladium acetate can likewise be used. On the other hand, as the copper salt, cupric acetate gives the best results, but also usable are cupric chloride and the various other copper salts. Further, in the case the palladium and copper salts are carboxylates, instead of dissolving them in the carboxylic acids in the form of salts, the addition can be made to the carboxylic acid in the form of a metal or a compound which can form the carboxylates in the carboxylic acids. While there are no particular restrictions imposed as to the amounts to be used of the copper salt and the complex of the palladium salt and the organo-quaternary ammonium compound, normally the use of not more than 0.4 mol. of the palladium salt, calculated as such, and not more than 1.6 mols of the copper salt, per 1,000 cc. of the carboxylic acid, is preferred.

If the conjoint use in the catalyst of alkali metal halides and/or alkali metal carboxylates are made along with the palladium and copper salts and the organo-quaternary ammonium halides, betaine or amine-N-oxides, the reaction-promoting effect is marked. As the alkali metal halides may be used the compounds of lithium and sodium with chlorine, bromine and iodine. On the other hand, the alkali metal carboxylates usually used are lithium and sodium carboxylates. The amounts used of the alkali metal halides and carboxylates are also without any particular restrictions, the usual amounts being respectively below 1.0 and 6.0 mols per 1,000 cc. of the carboxylic acid solution.

As to the reaction temperature, although it is possible to carrying out the reaction at room temperature or higher, a temperature ranging between 50° and 140° C. is generally preferred. The pressure at which the reaction is carried out is also without any particular restrictions, it being possible to operate at normal atmospheric pressure or higher, but since the reaction rate increases as the reaction pressure increases, the reaction is preferably carried out under superatmospheric pressure. While the mole ratio of the olefin and oxygen used is adopted in accordance with the reaction conditions in consideration of the explosion limit, generally a mole ratio on the order of 1 to 10 mols of olefin per mol of oxygen is suitable.

EXAMPLES 1–19

An electromagnetic stirrer equipped 500-cc. titanium-lined autoclave provided with a reflux condenser and a gas inlet line was charged with 200 cc. of acetic acid, 0.01 mol. of palladium chloride, 0.04 mol of cupric acetate and an organo-quaternary ammonium compound indicated in table 1, which compound forms a complex with the palladium chloride. The autoclave was closed and heated to 80° C., following which a gas mixture of ethylene and oxygen in a ratio of 5:1 was introduced for 3 hours at the rate of 100 cc. per minute. So as to maintain the pressure of the reaction system at 10 atmospheres during the reaction, the gas was continuously discharged. After completion of the reaction, the autoclave was cooled, followed by opening and taking out of the reaction product. The gas that was discharged from the reactor was passed through four dry-ice-cooled traps connected in series, and the acetaldehyde collected herein during the reaction was added to the aforesaid reaction product. The reaction product was analyzed by means of gas chromatography, and the vinyl acetate and acetaldehyde in the product were quantitatively determined. The results are shown in table 1.

Also shown in table 1, are the results of the control experiments conducted of the instances wherein the experiments were conducted under identical conditions but without adding an organo-quaternary ammonium compound (controls 1–4).

TABLE I

| | Additive | | Reaction product | |
|---|---|---|---|---|
| | Class | Amount used, mol | Vinyl acetate, g. | Acetaldehyde, g. |
| Example: | | | | |
| 1 | Tetraethylammonium chloride | 0.02 | 27.9 | 3.5 |
| 2 | Trimethylbenzylammonium chloride | 0.02 | 30.2 | 10.1 |
| 3 | Triethylbenzylammonium iodide | 0.02 | 19.9 | 1.6 |
| 4 | Cetylpyridinium chloride | 0.02 | 36.2 | 5.4 |
| 5 | 2-hydroxyethyltrimethylammonium hydroxide | 0.02 | 31.7 | 7.1 |
| 6 | Dimethyl(2-hydroxyethyl)dodecylammonium hydroxide | 0.02 | 33.1 | 9.8 |
| 7 | Methyl beta-(N-methyl-N-dodecyl) aminopropionate betaine hydrate | 0.02 | 26.9 | 5.6 |
| 8 | Trimethylbenzylammonium hydroxide | 0.02 | 29.5 | 6.4 |
| 9 | Betaine | 0.02 | 15.0 | 1.5 |
| 10 | Palmityl betaine | 0.02 | 16.1 | 1.1 |
| 11 | N-hexadecyloxymethyl-N,N-dimethyl betaine | 0.02 | 15.7 | 2.1 |
| 12 | Methyl beta-(N-methyl-N-dodecyl) aminopropionate betaine | 0.02 | 26.7 | 4.1 |
| 13 | Trimethylamine oxide | 0.01 | 11.8 | 2.0 |
| 14 | do | 0.02 | 20.0 | 2.4 |
| 15 | do | 0.04 | 25.1 | 6.3 |
| 16 | Trimethylamine oxide hydrochloride | 0.02 | 25.0 | 6.8 |
| 17 | Dimethylbenzylamine oxide hydrochloride | 0.02 | 18.2 | 1.8 |
| 18 | Pyridine oxide | 0.02 | 7.4 | 0.8 |
| 19 | Pyridine oxide hydrochloride | 0.02 | 7.9 | 1.6 |
| Control: | | | | |
| 1 | Not added | | 1.7 | 0.4 |
| 2 | Ammonium chloride | 0.03 | Trace | Trace |
| 3 | Pyridine hydrochloride | 0.02 | 4.0 | 0.4 |
| 4 | Ammonium acetate | 0.04 | 2.0 | 0.02 |

EXAMPLES 20-33

An electromagnetic stirrer equipped 500-cc. titanium-lined autoclave provided with a reflux condenser and a gas inlet line was charged with 200 cc. of acetic acid, 0.01 mol of palladium chloride, 0.04 mol of cupric acetate and an organo-quaternary ammonium compound indicated in table II, which compound forms a complex with the palladium chloride. The autoclave was closed and heated to 80° C., following which a gas mixture of propylene and oxygen was introduced in a ratio of 5:1 for 3 hours at the rate of 100 cc. per minute. During the reaction, the gas was continuously discharged so as to maintain the pressure of the reaction system at a atmospheres. After completion of the reaction and cooling of the autoclave, it was opened and the reaction product was removed. The gas discharged from the reactor was passed through two traps connected in series, which were thoroughly cooled in an dry ice-acetone bath, and the acetone collected herein during the reaction was added to the aforesaid reaction product. The propenyl acetate and acetone in the reaction product was quantitatively analyzed by means of gas chromatography. The results are shown in table II.

Also shown in table II are the experimental results of the instance in which the experiment was carried out under identical conditions as hereinbefore described but without adding an organo-quaternary ammonium compound (control 5).

EXAMPLES 34-37

An electromagnetic stirrer equipped 500-cc. titanium-lined autoclave provided with a reflux condenser and a gas inlet line was charged with 200 cc. of propionic acid, 0.01 mol of palladium chloride, 0.04 mol of cupric proportionate and an organo-quaternary ammonium compound indicated in table III, which compound forms a complex with the palladium chloride. The autoclave was then closed and heated to 80° c., following which a gas mixture of ethylene and oxygen in a ratio of 9:1 was introduced for 3 hours at the rate of 100 cc. per minute. The gas was continuously discharged during the reaction so as to maintain the pressure in the reaction system at 100 atmospheres. After completion of the reaction, the autoclave, after being cooled, was opened, and the reaction product was taken out. The gas discharged from the reactor was passed through two traps connected in series, which were thoroughly cooled in a dry ice-acetone bath, and the acetaldehyde collected herein during the reaction was added to the aforesaid reaction product. The vinyl proportionate and acetaldehyde of the reaction product was quantitatively analyzed by means of gas chromatography. The results are shown in table III.

Also shown in table III are the experimental results of the instance wherein the experiment was carried out under identical conditions as hereinbefore described but without adding an organo-quaternary ammonium compound (control 6).

TABLE II

| | Additive | | Reaction product, mol | | | | |
|---|---|---|---|---|---|---|---|
| | | | Propenyl acetate | | | | |
| | Class | Amount used, mol | n-Propenyl acetate | Isopropenyl acetate | Allyl acetate | Total | Acetone |
| Example: | | | | | | | |
| 20 | Tetraethylammonium chloride | 0.02 | 0.102 | 0.113 | 0.009 | 0.224 | 0.185 |
| 21 | Trimethylbenzylammonium chloride | 0.02 | 0.104 | 0.112 | 0.009 | 0.225 | 0.166 |
| 22 | Triethylbenzylammonium chloride | 0.02 | 0.103 | 0.110 | 0.009 | 0.222 | 0.155 |
| 23 | Butylpyridinium chloride | 0.02 | 0.115 | 0.127 | 0.011 | 0.253 | 0.226 |
| 24 | Cetylpyridinium chloride | 0.02 | 0.127 | 0.124 | 0.009 | 0.260 | 0.164 |
| 25 | 2-hydroxyethyltrimethylammonium hydroxide | 0.02 | 0.090 | 0.078 | 0.009 | 0.177 | 0.116 |
| 26 | Dimethyl(2-hydroxyethyl(dodecylammonium hydroxide | 0.02 | 0.076 | 0.090 | 0.008 | 0.174 | 0.091 |
| 27 | Trimethylbenzylammonium hydroxide | 0.02 | 0.098 | 0.095 | 0.009 | 0.203 | 0.104 |
| 28 | Betaine | 0.02 | 0.035 | 0.081 | 0.004 | 0.120 | 0.032 |
| 29 | N-hexadecyloxymethyl-N,N-dimethyl betaine | 0.02 | 0.036 | 0.086 | 0.005 | 0.127 | 0.063 |
| 30 | Methyl beta-(N-methyl-N-benzyl(aminopropionate betaine | 0.02 | 0.077 | 0.092 | 0.011 | 0.180 | 0.065 |
| 31 | Trimethylamine-N-oxide hydrochloride | 0.02 | 0.104 | 0.104 | 0.004 | 0.212 | 0.162 |
| 32 | Dimethylbenzylamine-N-oxide hydrochloride | 0.02 | 0.047 | 0.092 | 0.005 | 0.144 | 0.040 |
| 33 | Pyridine-N-oxide | 0.02 | 0.006 | 0.057 | 0.001 | 0.064 | 0.031 |
| Control: 5 | Not added | | 0.003 | 0.062 | 0.001 | 0.066 | 0.028 |

TABLE III

| | Additive | | Reaction product | |
|---|---|---|---|---|
| | Class | Amount used, mol | Vinyl propionate, g. | Acetaldehyde, g. |
| Example: | | | | |
| 34 | Trimethylbenzylammonium chloride | 0.02 | 27.8 | 1.4 |
| 35 | 2-hydroxyethyl-trimethyl-ammonium hydroxide | 0.02 | 26.6 | 1.6 |
| 36 | Betaine | 0.02 | 10.8 | 1.0 |
| 37 | Trimethylamine oxide | 0.02 | 33.5 | 4.8 |
| Control: 6 | Not added | | 1.6 | 0.3 |

EXAMPLES 38-41

An electromagnetic stirrer-equipped 500-cc. titanium-lined autoclave provided with a reflux condenser and a gas inlet line was charged with 200 cc. of an aliphatic carboxylic acid shown in table IV, 0.01 mol of palladium chloride, 0.04 mol of cupric chloride and 0.02 mol of cetylpyridium chloride, after which it was closed and heated to 80° C., followed by introducing for 3 hours at the rate of 100 cc. per minute a gas mixture of ethylene and oxygen in a ratio of 5:1 The gas was continuously discharged to ensure the maintenance of the pressure of the reaction system at 100 atmospheres during the reaction. After completion of the reaction, the autoclave, after cooling, was opened, and the reaction product was taken out. The discharged gas from the reactor was passed through four traps connected in series and cooled with dry ice. The acetaldehyde collected herein during the reaction was added to the aforesaid reaction product. The vinyl ester and acetaldehyde in the reaction product were quantitatively analyzed by means of gas chromatography. The results are shown in table IV.

TABLE IV

| Example | Aliphatic Carboxylic Acid | Reaction Product Vinyl Ester g. | Acetaldehyde g. |
|---|---|---|---|
| 38 | n-butyric acid | 50.8 | 9.7 |
| 39 | isobutyric acid | 41.2 | 15.2 |
| 40 | valeric acid | 55.3 | 10.5 |
| 41 | caproic acid | 60.8 | 12.3 |

EXAMPLES 42-50

Examples 1-19 were repeated except that as the organo-quarternary compounds which form complexes with the palladium chloride those indicated in table V were used instead of those in table I, and further the carboxylates and/or halides of alkali metals, as indicated, were charged. The experiments were otherwise carried out as described in examples 1-19. The results are shown in table V.

Also shown in table V are the experimental results of instances wherein the experiments were carried out under identical conditions as hereinabove described but without adding the organo-quaternary ammonium compounds (controls 7-9).

TABLE V

| | Additives | | Reaction product | |
|---|---|---|---|---|
| | Class | Amount used, mol | Vinyl acetate, g. | Acetaldehyde, g. |
| Example: | | | | |
| 42 | Triethylbenzylammonium chloride | 0.02 | 36.1 | 15.9 |
| | Lithium acetate | 0.30 | | |
| | Lithium chloride | 0.02 | | |
| 43 | Cetylpyridinium chloride | 0.02 | 38.5 | 10.7 |
| | Lithium acetate | 0.30 | | |
| 44 | Cetylpyridinium chloride | 0.02 | 37.0 | 13.5 |
| | Lithium chloride | 0.02 | | |
| 45 | Palmityl betaine | 0.02 | 21.7 | 3.7 |
| | Sodium chloride | 0.02 | | |
| 46 | N-hexadecyloxymethyl-N,N-dimethyl betaine | 0.02 | 28.5 | 8.7 |
| | Sodium chloride | 0.30 | | |
| 47 | Methyl beta-(N-methyl-N-benzyl) aminopropionate betaine | 0.02 | 25.2 | 4.2 |
| | Sodium chloride | 0.02 | | |
| 48 | Triethylamine oxide | 0.02 | 27.5 | 8.0 |
| | Lithium chloride | 0.02 | | |
| 49 | Dimethylbenzylamine oxide hydrochloride | 0.02 | 33.0 | 9.7 |
| | Sodium chloride | 0.02 | | |
| 50 | Pyridine oxide | 0.02 | 21.7 | 3.7 |
| | Sodium chloride | 0.02 | | |
| Control: | | | | |
| 7 | Lithium acetate | 0.02 | 10.6 | 0.6 |
| 8 | Sodium chloride | 0.02 | 13.5 | 6.4 |
| 9 | Lithium chloride | 0.02 | 11.2 | 1.3 |

EXAMPLES 5-53

Excepting that as the organo-quaternary ammonium compounds which form complexes with palladium chloride those shown in table VI were added instead of those shown in table II and further carboxylates and/or halides of alkali metals were charged, the experiments were otherwise carried out as in examples 20-33. with the results shown in table VI.

Also shown in table VI are the experimental results of instances wherein the experiments were carried out under identical conditions but without adding the organo-quaternary compound (controls 10-13).

EXAMPLES 54-56

Expecting that as the organo-quaternary ammonium compounds which form complexes with palladium chloride those shown in table VII were added instead of those shown in table III and further carboxylates and/or halides of alkali metals were charged, the experiments were otherwise carried out under identical reaction conditions as in examples 34-37. with the results shown in table VII.

TABLE VI

| | Additives | | Reaction product, mol | | | | |
|---|---|---|---|---|---|---|---|
| | | | Propenyl acetate | | | | |
| | Class | Amount used mol | n-Propenyl acetate | Isopropenyl acetate | Allyl acetate | Total | Acetone |
| Example: | | | | | | | |
| 51 | Cetylpyridinium chloride | 0.02 | 0.129 | 0.106 | 0.010 | 0.245 | 0.266 |
| | Lithium chloride | 0.02 | | | | | |
| 52 | Cetylpyridinium chloride | 0.02 | 0.152 | 0.126 | 0.011 | 0.289 | 0.175 |
| | Lithium acetate | 0.30 | | | | | |
| 53 | Methyl beta-(N-methyl-N-dodecyl) aminopropionate betaine | 0.02 | 0.109 | 0.113 | 0.007 | 0.229 | 0.220 |
| | Lithium chloride | 0.02 | | | | | |
| Control: | | | | | | | |
| 10 | Lithium chloride | 0.02 | 0.033 | 0.086 | 0.002 | 0.121 | 0.027 |
| 11 | Sodium chloride | 0.02 | 0.058 | 0.086 | 0.002 | 0.146 | 0.091 |
| 12 | Lithium acetate | 0.30 | 0.055 | 0.045 | 0.008 | 0.108 | 0.066 |
| 13 | Lithium chloride | 0.02 | 0.078 | 0.048 | 0.005 | 0.131 | 0.173 |
| | Lithium acetate | 0.30 | | | | | |

Also shown in table VII are the experimental results of instances wherein the experiments were carried out under identical conditions as hereinabove described but without adding the organo-quaternary ammonium compounds (controls 14–16).

TABLE VII

| Class | Additives | Amount used, mol | Reaction product Vinyl propionate, g. | Acetaldehyde, g. |
|---|---|---|---|---|
| Example 54 | Cetylpyridinium chloride | 0.02 | 35.2 | 6.5 |
| | Lithium chloride | 0.02 | | |
| Control 14 | Lithium chloride | 0.02 | 10.5 | 0.7 |
| Example 55 | Cetylpyridinium chloride | 0.02 | 20.3 | 1.9 |
| | Lithium propionate | 0.30 | | |
| Control 15 | Lithium propionate | 0.30 | 8.0 | 1.2 |
| Example 56 | Cetylpyridinium chloride | 0.02 | 40.4 | 10.6 |
| | Lithium chloride | 0.02 | | |
| | Lithium propionate | 0.30 | | |
| Control 16 | Lithium chloride | 0.02 | 25.1 | 5.0 |
| | Lithium propionate | 0.30 | | |

We claim:

1. In the process of preparing the corresponding carboxylic acid ester of unsaturated alcohols by contacting olefins selected from ethylene and propylene with a lower alkanoic acid in the presence of a gas selected from the group consisting of oxygen and oxygen-containing gases, using as the catalyst a palladium salt and a copper salt, the improvement comprising effecting said reaction in the presence of an organo-quaternary ammonium compound which can form under the reaction conditions a carboxylic-acid-soluble complex with said palladium salt, said organo-quaternary ammonium compound being selected from the group consisting of:

a. an organo-quaternary ammonium halide of the following formula:

$$R_1R_2R_3R_4NX$$

wherein $R_1-R_4$, which may be the same or different, are members selected from the class consisting of $C_1-C_{18}$ alkyl groups; $C_1-C_{18}$ alkyl groups containing at least one member selected from the class consisting of an ether linkage and hydroxyl and carboxyl groups; phenyl group and benzyl group; and X is a halogen atom; with the proviso that $R_1-R_3$ together with the nitrogen atom may form a heterocyclic nucleus selected from the pyridine nucleus and quinoline nucleus;

b. an organo-quaternary ammonium hydroxide of the following formula:

$$R_1R_2R_3R_4NOH$$

wherein $R_1-R_4$, which may be the same or different, are members selected from the class consisting of $C_1-C_{18}$ alkyl groups; $C_1-C_{18}$ alkyl groups containing at least one member selected from the class consisting of an ether linkage and hydroxyl and carboxyl groups; and benzyl groups; with the proviso that $R_1-R_3$ together with the nitrogen atom may form a heterocyclic nucleus selected from the pyridine nucleus and quinoline nucleus;

c. betaine and derivatives thereof of the following formulas $$R_5R_6R_7N(CH_2)_nCOO$$

and $$R_5R_6R_7NCH(R_8)COO$$

wherein $R_5-R_7$, which may be the same or different, are members selected from the class consisting of $C_1-C_{18}$ alkyl groups, $C_1-C_{18}$ alkyl groups having an ether linkage, and benzyl group, $R_8$ is an alkyl group having 1–18 carbon atoms, and n is an integer 1–3;

d. amine-N-oxides and the hydrohalides thereof of the following formula:

$$R_9R_{10}R_{11}NO$$

wherein $R_9-R_{11}$, which may be the same or different, are members selected from the class consisting of $C_1-C_3$ alkyl groups and phenyl and benzyl groups.

2. The process of claim 1 wherein said organo-quaternary ammonium compound is said organo-quaternary ammonium halide.

3. The process according to claim 2 wherein the halogen ion of said organo-quaternary ammonium halide is chlorine ion.

4. The process of claim 1 wherein said organo-quaternary ammonium compound is said organo-quaternary ammonium hydroxide.

5. The process of claim 1 wherein said organo-quaternary ammonium compound is selected from the group consisting of betaine and said derivatives thereof.

6. The process of claim 1 wherein said organo-quaternary ammonium compound is selected from the group consisting of said amine-N-oxides and the hydrohalides thereof.

7. The process according to claim 6 wherein the hydrohalide of said amine oxide is an aqueous solution containing an amine oxide and a hydrohalide, said hydrohalide of amine oxide being formed in the reaction zone when said aqueous solution is added to the reaction system.

8. The process according to claim 1 wherein said lower alkanoic acid is an acid selected from the group consisting of acetic, propionic, butyric, valeric and caproic acids.

9. The process according to claim 1 wherein said carboxylic acid esters of unsaturated alcohols are vinyl acetate.

10. The process according to claim 1 wherein said palladium salt is a member selected from the group consisting of halides and aliphatic carboxylates of palladium.

11. The process according to claim 1 wherein said copper salt is a member selected from the group consisting of halides and carboxylates of copper.

12. The process according to claim 1 wherein said organo-quaternary ammonium compound is used in an amount of 0.001 to 1.0 mol per 1,000 cc. of the aliphatic carboxylic acid.

13. The process according to claim 1 wherein said reaction is effected at a temperature ranging between 50° and 140°C.

14. The process according to claim 1 wherein said reaction is effected in the presence of at least one member selected from the group consisting of alkali metal salts of aliphatic carboxylic acids and alkali metal halides.

15. The process according to claim 14 wherein the metal of said alkali metal salt is a member selected from lithium and sodium.

16. The process according to claim 14 wherein said alkali metal halide is used in an amount of not more than 1.0 mol per 1,000 cc. of said lower alkanoic acid.

17. The process according to claim 14 wherein said alkali metal carboxylate is used in an amount of not more than 6 mols per 1,000 cc. of said lower alkanoic acid.